United States Patent [19]

Sawachi

[11] Patent Number: 5,019,909
[45] Date of Patent: May 28, 1991

[54] VIDEO CAMERA FOR PHOTOGRAPHING PAPERS

[75] Inventor: Youichi Sawachi, Tokyo, Japan

[73] Assignee: Fuji Photo Film Co., Ltd., Kanagawa, Japan

[21] Appl. No.: 303,264

[22] Filed: Jan. 30, 1989

[30] Foreign Application Priority Data

Jan. 30, 1988 [JP] Japan .................. 63-20770

[51] Int. Cl.$^5$ .................. H04N 5/202; H04N 9/69
[52] U.S. Cl. ......................... 358/164; 358/32
[58] Field of Search .................. 358/32, 80, 164, 169

[56] References Cited

U.S. PATENT DOCUMENTS

| | | | |
|---|---|---|---|
| 3,368,033 | 2/1968 | Dischert et al. | 358/164 |
| 3,534,168 | 10/1970 | Lookeren | 358/164 |
| 3,588,338 | 6/1971 | Dischert | 358/164 |
| 3,752,905 | 8/1973 | Schneider | 358/164 |
| 4,038,685 | 7/1977 | Bazin | 358/32 |
| 4,489,349 | 12/1984 | Okada | 358/164 |
| 4,651,210 | 3/1987 | Olson | 358/164 |
| 4,797,745 | 1/1989 | Westell | 358/164 |
| 4,799,106 | 1/1989 | Moore et al. | 358/164 |
| 4,829,381 | 5/1989 | Song et al. | 358/32 |
| 4,833,527 | 5/1989 | Kondo | 358/32 |
| 4,847,524 | 7/1989 | Van Rody et al. | 358/164 |
| 4,866,513 | 9/1989 | Takahashi | 358/164 |

FOREIGN PATENT DOCUMENTS

232682 9/1988 Japan .

Primary Examiner—John W. Shepperd
Assistant Examiner—Michael D. Parker

[57] ABSTRACT

A video camera for photographing papers which is used in a video apparatus for office automation such as an electronic image input apparatus. The video camera includes an image pickup part for picking up the images of papers and a signal processing part for converting a video signal obtained from the image pickup part into a given format. The signal processing part includes a $\gamma$ correction circuit for correcting the $\gamma$ value of the video signal obtained from the image pickup part. The $\gamma$ correction circuit has at least two discrete $\gamma$ correction values so that a proper $\gamma$ correction value can be selected according to the objects to be photographted. For example, when the objects to be photographted are black and white papers, a value of 0.45 or greater is selected for the $\gamma$ correction value. By selecting the $\gamma$ correction value in this manner, even when the black and white papers are photographed, clear images thereof will result for display on the screen of a television monitor.

9 Claims, 5 Drawing Sheets

VIDEO CAMERA FOR PHOTOGRAPHING PAPERS

BACKGROUND OF THE INVENTION

1. Field of the Invention

The present invention relates to a video camera for photographing papers and, in particular, to a video camera which is used in a video apparatus for office automation (OA) such as an electronic image input apparatus and the like.

2. Description of the Related Art

The present invention is used in a video apparatus for OA (office automation) in which a color video camera is mounted to a support member, manuscripts placed on a manuscripts carrying table are photographed, and the video outputs thereof are input to a television monitor or the like.

The above-mentioned OA video apparatus can be used as an overhead proctor (OHP) by connecting the apparatus to a television monitor, to a VTR or to a still image recording apparatus, which records still images on a video floppy disc. Thereby, a filing system is provided which records papers such as pictures, drawings, documents and the like.

The video camera that is used in the above-mentioned OA video apparatus is an ordinary color video camera which is in principle designed to photograph an ordinary object. For this reason, the color video camera is constructed in such a manner that the γ (gamma) value of a gamma correction circuit for correcting the γ value of a video signal obtained from an image pickup section of the video camera is adjusted by a semi-fixed volume control to be approximately 0.45. Also, the γ value cannot be altered during operation of the apparatus.

When the above-mentioned video camera is used to take a picture of papers, the γ value of the gamma correction circuit is desired to be approximately 0.45 for materials such as pictures (positive images) and the like which are similar to ordinary objects having a good reproducibility of gradation on the screen of a television monitor.

Figure 7:
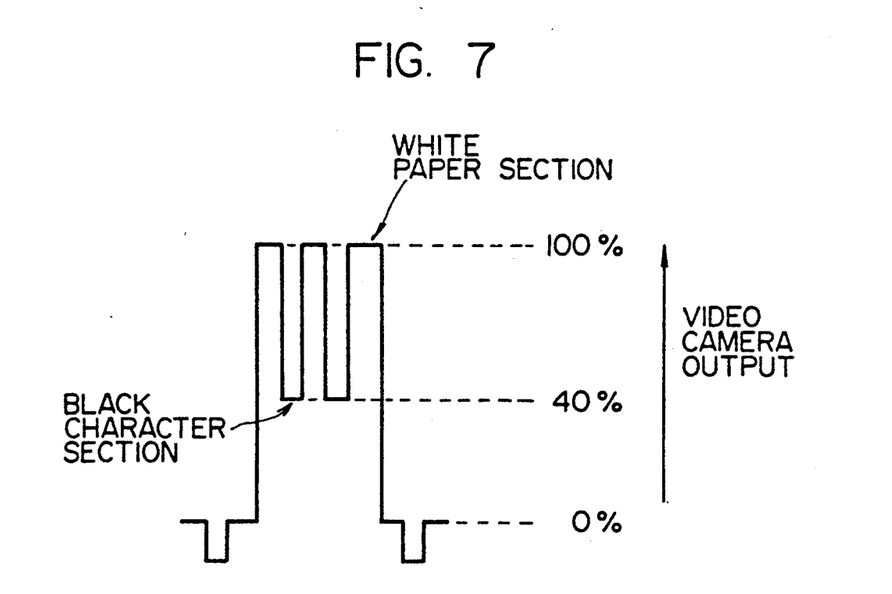
FIG. 7 is an explanatory view illustrating an example of the video signal of the video camera.

In contrast when the above-mentioned video camera is used to photograph black and white papers and the γ value of gamma correction circuit is set to approximately 0.45 in a similar manner as in the case of the ordinary objects to perform the gamma correction, the characters of the black and white papers on the screen of the television monitor are hinged with white and the characters are hard to see. In this case, if the quantity of light entering the photographing optical system of the video camera is reduced by a stop diaphragm or the like, then the whiteness of the characters can be truly eliminated by the blank blank sections of the papers becoming darker and the characters will be more difficult, to see. This occurs because a certain degree of brightness in the black sections of the papers exists. That is, when the output level of the video camera is set at 100%, the output level of the black sections does not provide 0% but, as shown in FIG. 7, the output level actually provides approximately 40% due to the existence of the brightness so that the brightness level difference between the black and white sections, namely, the contrast therebetween is too small.

SUMMARY OF THE INVENTION

The present invention is directed to eliminating the drawbacks found in the above-mentioned video cameras.

Accordingly, it is an object of the invention to provide a video camera for photographing papers which is capable of providing a sufficient contrast even when the camera is used to photograph black and white papers.

In order to achieve this object, according to the present invention, there is provided a video camera for photographing papers which includes image pickup means for picking up the images of papers and signal process means for converting a video signal obtained from the image pickup means into a given format. Wherein, the signal process means includes gamma correction means having two or more kinds of discrete correction values for correcting the γ value of the video signal obtained from the image pickup means, and also being able to set one of the γ value correction values according to the objects to be photographed.

In the video camera for photographing papers according to the present invention, the video signal that is obtained from the image pickup means is gamma corrected by a gamma correction circuit included in the signal process means.

The gamma correction circuit has a plurality of discrete correction valves. If the objects to be photographed are black and white documents, then a value equal to or greater than 0.45 can be set automatically or manually as a γ correction value in the gamma correction circuit.

Therefore, according to the present invention, there can be obtained a sufficient black and white contrast for the output of the video camera, and clear images of the papers can be obtained on the screen of a television monitor.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION FOR THE PREFERRED EMBODIMENTS OF THE INVENTION

A detailed description will be given hereunder for the preferred video camera for photographing papers with reference to the accompanying drawings.

Figure 1:
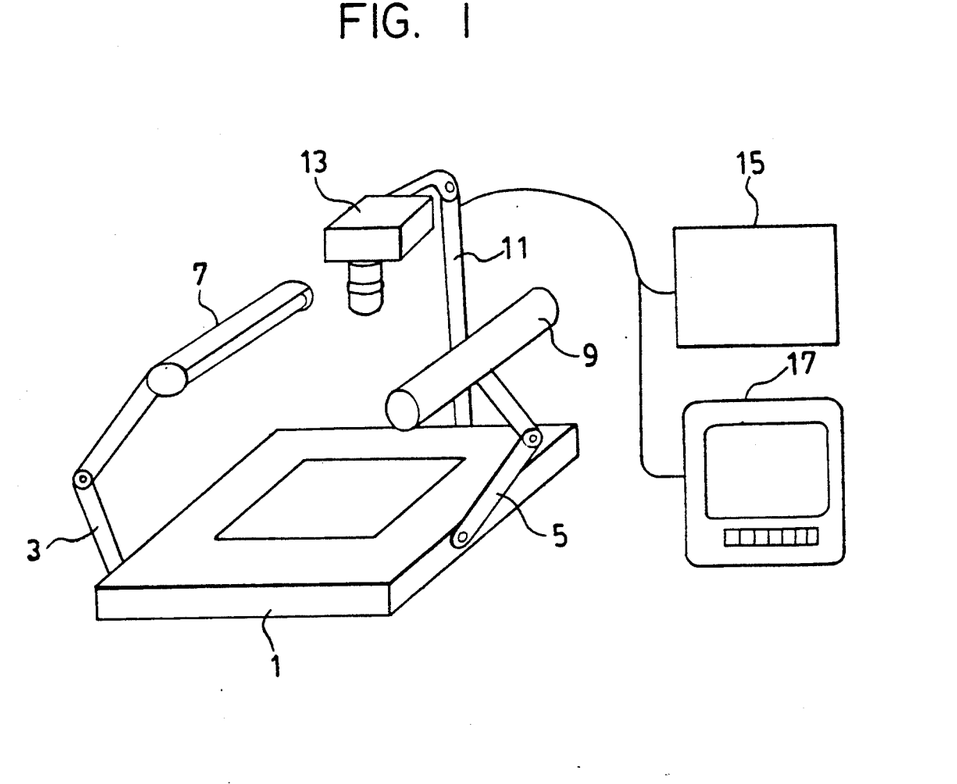
FIG. 1 is a perspective view illustrating an image input apparatus for an embodiment of the present invention.

Referring first to FIG. 1, an outer appearance of an image input apparatus for an embodiment of the present invention is illustrated. In FIG. 1, a manuscript carrying tables is provided on which manuscripts are to be placed and the surface of the table is colored with an achromatic color for making white balance adjustments. Arms 3 and 5 are respectively mounted to the respective side surfaces of the manuscript carrying table 1 so that the arms 3 and 5 may be folded. Two cool white fluorescent lamps 7 and 9, which are used to illuminate the surface of the manuscript carrying table 1, are fixedly secured to the leading ends of the two arms 3 and 5, respectively.

Also, a leg 11 is foldably mounted to another side surface of the manuscript carrying table 1 and a video camera 13 is mounted to the leg 11. When the manuscripts placed on the manuscript carrying table 1 are photographed by the video camera 13, the video signals thereof are processed or converted into a given format (for example, NTSC system). Then the signals are output to a still image recording apparatus 15, which records still images onto a recording medium such as a magnetic disc or the like, or to a television monitor 17.

Figure 2:
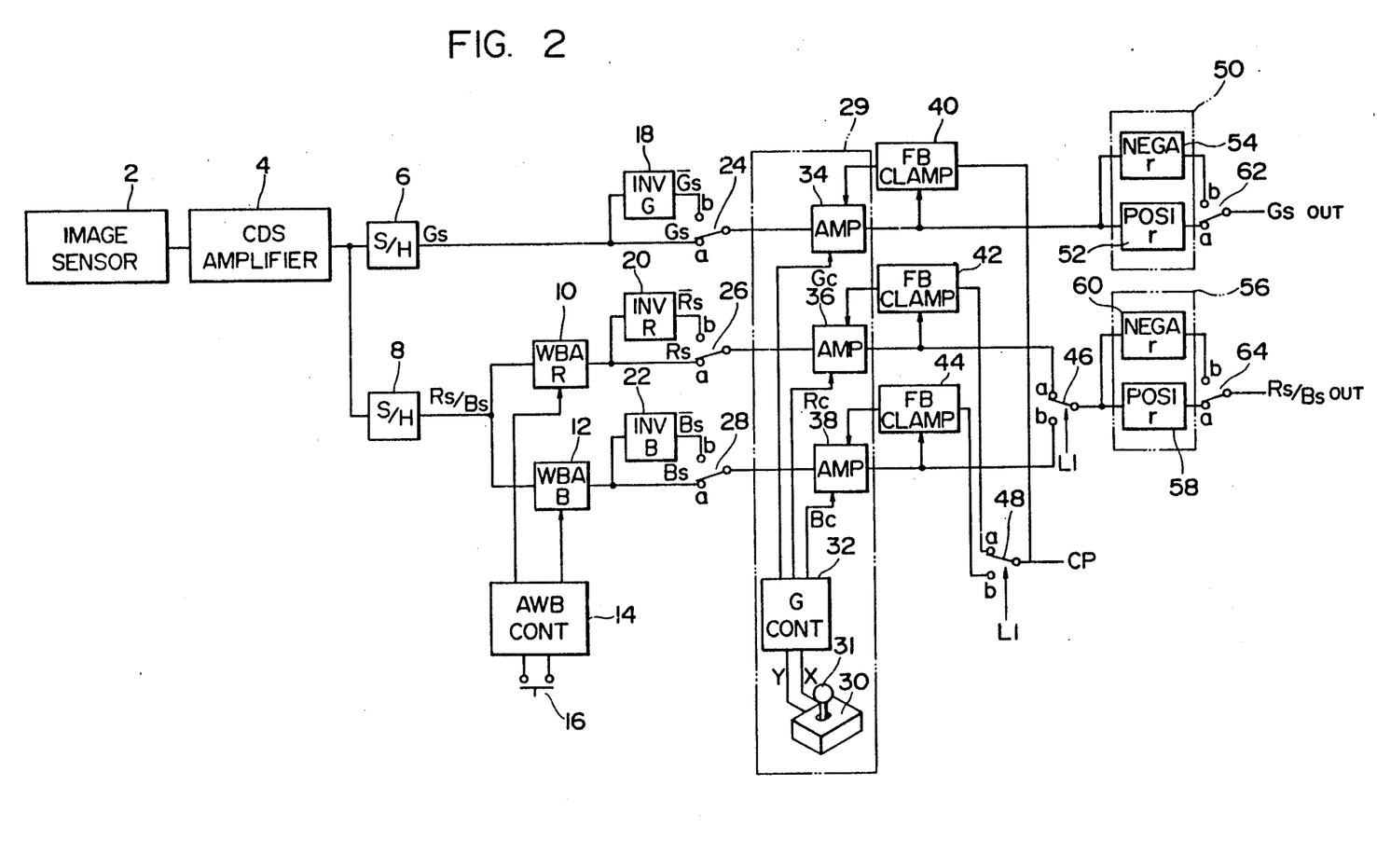
FIG. 2 is a block diagram schematically illustrating the electrical structure of the main parts of the image input apparatus for an embodiment of the present invention.

Referring next to FIG. 2, an electrical structure of main parts of an image input apparatus is illustrated for embodiment of the present invention.

In FIG. 2, on the light receiving surface of a solid-state image sensor 2, such as a CCD or the like, for color photographing positive or negative color film, there is arranged a color filter having a green stripe/red and blue line sequence. Optical images, which are produced by green (G), red (R) and blue (B) light rays that have transmitted through the color filter, are focused on the light receiving surface of the solid-state image sensor 2. By scanning horizontally the respective image elements on the light receiving surface, color signals Gs, Rs, Gs, Rs, - - -, Gs, Bs, Gs, Bs, - - - can be generated and then output to a correlation square sampling (CDS) amplifier 4. The right-side light receiving surface of the image sensor in which the color filter is located is shielded from light by means of a light shield material. Thereby, the color signals are output every one horizontal scan from the solid-state image sensor, and a non-signal area is formed, which is referred to as an optical black, corresponding to the light shield area thereof.

The CDS amplifier 4 is a circuit which sampling detects after the respective color signals collectively are processed, amplifies the sampling detected color signals up to a given . level and the signals outputs them to sample hold circuits (S/H) 6 and 8.

The sample hold circuits 6 and 8 are circuit for sampling the green signal Gs and red signal Rs or blue signal Bs respectively from the CDS amplifier 4 at a given frequency and also holds the signal for a given period of time. The green signal Gs that is output from the sample hold circuit 6 is input to a polarity inverting circuit (INV G)18 and to the contact a of an analog switch 24. Also, the line sequentialized red signal Rs or blue signal Bs from the sample hold circuit 8 is input to white balance amplifiers (WBA R) 10 and (WBA B) 12 of which gains are variable.

The white balance amplifiers 10 and 12 are amplifiers for amplifying the red signal Rs or blue signal Bs respectively up to a given level in order to thereby adjust the white balance. The output signal Rs of the white balance amplifier 10 is input to a polarity inverting circuit 20 and to the contact a of an analog switch 26, and the output signal Bs of the white balance amplifier 12 is input to a polarity inverting circuit 22 and to the contact a of an analog switch 28.

The gains of the white balance amplifiers 10 and 12 can be controlled by an automatic white balance amplifier control circuit (AWB CONT.)14.

The automatic white balance control circuit 14 receives the green signal Gs from the sample hold circuit 6 as well as the red signal Rs and blue signal Bs respectively from the white balance amplifiers 10 and 12, and also controls the gains of the white balance amplifiers 10 and 12 so that the levels of the red signal Rs and blue signal Bs are respective equal to the level of the green signals Gs. The above-mentioned white balance adjustment is to be performed automatically when a push switch 16 connected to the automatic white balance control circuit 14 is depressed.

The polarity inverting circuits 18, 20 and 22 invert the polarities of the green signal Gs, red signal Rs and blue signal Bs, respectively, and output the color signals ($\overline{G}$Gs, $\overline{R}$Rs and $\overline{B}$Bs) that are respectively complementary colors, that is, magenta (Mg), cyanogen (Cy) and yellow (Ye) of green (G), red (R) and blue (B), respectively. In other words, e the inverting circuits output the color signals of images, each pair of images have a positive and negative image relationship therebetween. The output signals $\overline{G}$Gs, $\overline{R}$Rs and $\overline{B}$Bs output from the polarity inverting circuits 18, 20, and 22 are input to the contacts b of the analog switches 24, 26 and 28, respectively.

The analog switches 24, 26 and 28 can be switched over by operating their associated positive/negative change-over switches (not shown). For the positive images, the contact a is selected, and, for the negative images, the contact b is selected.

A paint circuit 29, which is illustrated in FIG. 2, is composed of a joystick 30, a gain control circuit G CONT.) 32, and feedback type variable gain amplifiers 34, 36 and 38. The paint circuit 29 is a circuit which adjusts the signal levels of the positive-image color signals Gs, Rs and Bs or the negative-image color signals $\overline{G}$Gs, $\overline{R}$Rs and $\overline{B}$Bs selected by the analog switches 24, 26 and 28, respectively, to thereby emphasize the colors of the color images.

The joystick 30 is an operation section for specifying the emphasizing color of the color images or for performing a white balance adjustment when the object to be photographed is a negative image. By operating a control lever in a given direction, operation signals X and Y for emphasizing a given color can be output from the joystick 30.

The gain control circuit 32, in accordance with the operation signals X and Y that are output from the joystick 30, outputs gain control signals Gc, Rc, and Bc respectively for controlling the gains of the above-mentioned variable gain amplifiers 34, 36 and 38.

The variable gain amplifiers 34, 36 and 38 respectively control the levels of the green signal Gs ($\overline{G}$Gs), red signal Rs ($\overline{R}$Rs) and blue signal Bs ($\overline{B}$Bs) in accordance with the quantity of gain control to be determined by the gain control signals Gc, Rc and Bc from the gain control circuit 32, so that the color emphasis of the color images can be achieved. In the case of the negative images, the variable gain amplifiers 34, 36 and 38 are gain controlled such that the white levels of the color signals $\overline{G}Gs$, $\overline{R}Rs$ and $\overline{B}Bs$ are equal to one another. Thereby, the white balance adjustment or control is realized.

The green signal Gs ($\overline{G}Gs$) from the variable gain amplifier 34 is input to a feedback clamp circuit (FB CLAMP) 40 and a gamma correction circuit 50.

Also, the red signal Rs ($\overline{R}Rs$) and blue signal Bs ($\overline{B}Bs$) from the variable gain amplifiers 36 and 38 respectively are input to their associated feedback clamp circuits (FB CLAMP) 42 and 44 and to the contacts a and b of an analog switch 46 respectively.

The feedback clamp circuits 40, 42 and 44, in accordance with a clamp pulse CP having a given pulse duration that is output from a synchronization signal generation circuit (not shown), clamp the respective black levels of the green signal Gs ($\overline{G}Gs$), red signal Rs ($\overline{R}Rs$) and blue signal ($\overline{B}Bs$) from the variable gain amplifiers 34, 36 and 38 respectively at a given level and then feedback the signals to the variable gain amplifiers 34, 36 and 38, respectively.

A change pulse CP is supplied to the feedback clamp circuit 40 from the synchronization signal generation circuit every 1 H (H represents 1 horizontal scan period) at such a timing that coincides with the optical black of the green signal Gs ($\overline{G}Gs$).

On the other hands, the clamp pulse CP is supplied to the feedback clamp circuits 42 and 44 from the synchronization signal generation circuit by means of an analog switch 48 at timings coinciding with the optical black of the red signal Rs ($\overline{R}Rs$) and blue signal Bs ($\overline{B}Bs$). The analog switch 48 is adapted for being switched over alternately every 1 H in accordance with a line decision signal L1 which is output from the synchronization signal generation circuit and rises and falls respectively every 1 H.

In other words, the clamp pulses CP are supplied to the feedback clamp circuits 42 and 44 respectively every 2 H at timings that differ 1 H from each other.

The analog switch 46 is changed over every 1 H according to the above-mentioned line decision signal L1 for converting the red signal RS ($\overline{R}Rs$) and the blue signal Bs ($\overline{B}Bs$) from the variable gain amplifiers 36 and 38 into line sequential signals, respectively.

The green signal Gs ($\overline{G}Gs$) from the variable gain amplifier 34 and the red Rs ($\overline{R}s$) and blue Bs ($\overline{B}Bs$) signals from the analog switch 46 are input to the gamma correction circuits 50 and 56, respectively.

The gamma correction circuits 50 and 56 respectively correct the gamma values of the green signal Gs ($\overline{G}Gs$), the red signal Rs ($\overline{R}Rs$) and the blue signal Bs ($\overline{B}Bs$) so that the γ value of the whole image display system consisting of an ordinary television and the like can be 1. In other words, the gamma correction circuits 50 and 56 correct the γ value of a cathode ray tube of the television, which is normally between 2.2 and 0.45;

This correction is made for the images of ordinary objects having positive or negative images. However, when the objects to be photographed by the image sensor 2 are black and white documents, the γ values of the respective color signals are corrected to values greater than 0.45, so that a sufficient black and white contrast can be provided. This will be discussed afterwards in this specification.

The gamma correction circuit 50 includes a positive gamma correction circuit 52 which corrects the gamma value of the green signal Gs of the positive images, and a negative gamma correction circuit 54 for correcting the gamma value of the green signal $\overline{G}Gs$ of the negative images. The green signals Gs and $\overline{G}Gs$ from the gamma correction circuits 52 and 54 are input to the contacts a and b of an analog switch 62, respectively.

The gamma correction circuit 56 a positive gamma correction circuit 58 for correcting the gamma value of the positive image red signal Rs or blue signal Bs, and a negative gamma correction circuit 60 for correcting the gamma value of the negative image red signal $\overline{R}Rs$ or blue signal Bs. The red signal Rs or blue signal Bs from the positive gamma correction circuit 58 is input to the contact a of an analog switch 64, while the red signal $\overline{R}Rs$ or blue signal $\overline{B}Bs$ from the negative gamma correction circuit 60 is input to the contact b of the analog switch 64.

The analog switches 62 and 64 are mechanically coupled with the before-mentioned analog switches 24, 26 and 28 for being switched over simultaneously. The analog switch 62 selects either the green signal Gs from the positive gamma correction circuit 52 of the gamma correction circuit 50 or the green signal $\overline{G}Gs$ from the gamma correction circuit 54 of the gamma correction circuit 50. The analog switch 64 selects the red signal Rs from the positive gamma correction circuit 58 of the gamma correction 56 or the red signal $\overline{R}Rs$ from the negative gamma correction circuit 60, and also selects the blue signal Bs from the positive gamma correction circuit 58 or the blue signal $\overline{B}Bs$ from the negative gamma correction circuit 60.

The green signal Gs (Gs), and the red signal Rs ($\overline{R}Rs$) or the blue signal Bs ($\overline{B}Bs$) selected by the analog switches 62 and 64 are input to a color encoder (not shown), in which encoder the signals are processed or converted into color video signals of a given format.

In the above-mentioned structure, the three primary color signals of the object that are obtained from the image sensor 2 are correlation processed and amplified up to a given level by the CDS amplifier 4. Then, the signal are output to the sample hold circuits 6 and 8.

The sample hold circuits 6 and 8 sample the green signal Gs, the red signal Rs or the blue signal Bs among the output signals of the CDS amplifiers, at a given frequency, and hold the sampled signal for a given period of time. The green signal Gs that is output from the sample hold circuit 6 or the green signal $\overline{G}Gs$ from the polarity inverting circuit 18 is input through the analog switch 24 to the variable gain amplifier 34 of the paint circuit 29.

On the other hand, with respect to the red signal Gs or the blue signal Bs from the sample hold circuit 8, when the push switch 16 is depressed, the level of the red or blue signal is adjusted by the white balance amplifiers 10 and 12 so that the white balance adjustment can be achieved.

When executing the white balance adjustment, no materials are placed on the manuscript carrying table 1 and, with the surface of the manuscript carrying table 1 being colored with achromatic colors and illuminated by the two cool white fluorescent lamps 7 and 9, the surface of the manuscript carrying table 1 is photographed by the video camera 13.

For this reason, in the white balance adjustment, the surface of the manuscript carrying table 1 is being photographed by the image sensor 2 and the output signal of the image sensor 2 is being input through the CDS amplifier 4 to the sample hold circuits 6 and 8.

In this state, when the push switch 16 is pushed down, then the automatic white balance control circuit 14 takes in the green signal Gs that is output from the sample hold circuit 6 and the red signal Rs and the blue signal Bs from the white balance amplifiers 10 and 12 respectively, and controls the gains of the white balance amplifiers 10 and 12 with the level of the green signal Gs as a reference so that the red signal Rs and the blue signal Bs are equal in level to the green signal Gs. As a result of this, the white balance of the color video signal of the object to be photographed by the image sensor 2 can be adjusted properly.

Now, the red signal Rs that is output from the white balance amplifier 10 or the red signal $\overline{R}Rs$ output from the polarity inverting circuit 20 is input through the analog switch 26 to the variable gain amplifier 36 of the paint circuit 29. Also, the blue signal Bs output from the white balance amplifier 12 or the blue signal is output from the polarity inverting circuit 22 is input through the analog switch 28 to the variable gain amplifier 38 of the paint circuit 29.

The green signals Gs ($\overline{G}Gs$), the red signals Rs ($\overline{R}Rs$) and the blue signals Bs ($\overline{B}Bs$) that have been amplified by the variable gain amplifiers 34, 36 and 38 up to a given level are output to the feedback clamp circuits 40, 42 and 44, respectively. The black levels of these signals are clamped at a given level by the feedback clamp circuits 40, 42 and 44.

The green signals Gs ($\overline{G}Gs$) from the variable gain amplifier 34 are input to the gamma correction circuit 50 and then the gamma values of the green signals Gs ($\overline{G}Gs$) are corrected to a given value by the gamma correction circuit 50.

The red signals Rs ($\overline{R}Rs$) and the blue signals Bs ($\overline{B}Bs$) output from the variable gain amplifier 34 and 36 respectively are input alternately through the analog switch 46 to the gamma correction circuit 56 every 1 H. The gamma values of the signals are then corrected to a given value by the gamma correction circuit 56.

The green signal Gs ($\overline{G}Gs$) output from the gamma correction circuit 50, and the red signals Rs ($\overline{R}Rs$) or the blue signals Bs ($\overline{B}Bs$) from the gamma correction circuit 56 are input through the analog switches 62 and 64 to the color encoder to respectively. Then the signals are processed or converted into the color video signals in the given format by the color encoder. The converted video signals are then supplied to an image display apparatus such as a television monitor (not shown) or the like, so that the color images can be displayed on the screen of the image display apparatus.

In the above-mentioned operation, if the color of the monitor image to be emphasized is specified by means of the joystick 30 of the paint circuit 29, then the gain control signals Gc, Rc and Bc for emphasizing the specified color are output from the gain control circuit 32 to the variable gain amplifiers 34, 36 and 38, respectively. As a result of this, the three primary color signals, the green signals Gs ($\overline{G}Gs$), the red signals Rs ($\overline{R}Rs$) and the blue signal Bs ($\overline{B}Bs$), are adjusted by the variable gain amplifiers 34, 36 and 38 respectively to the levels that correspond to the emphasized color of the color image.

Figure 3:
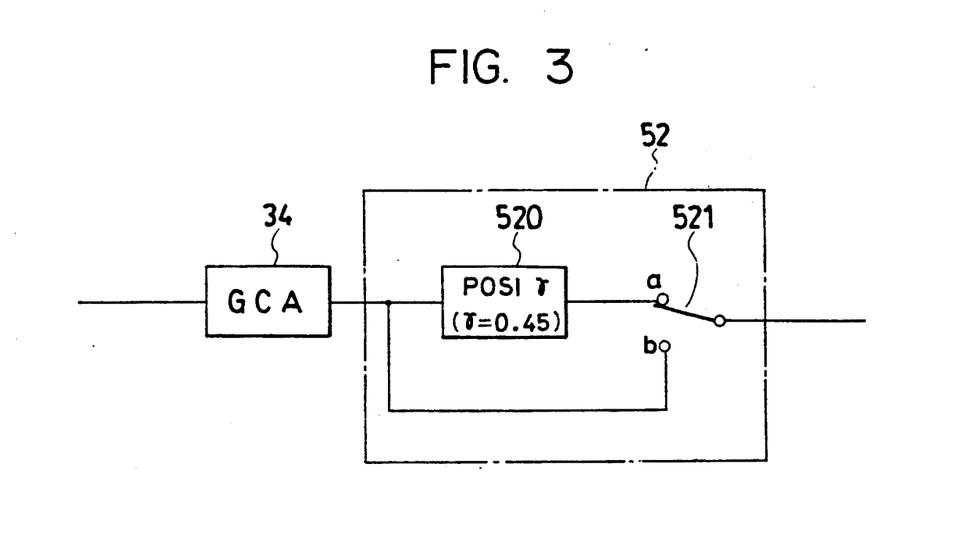
FIG. 3 is a schematic view of an embodiment of a positive gamma correction circuit which is illustrated in FIG. 2.
Figure 4:
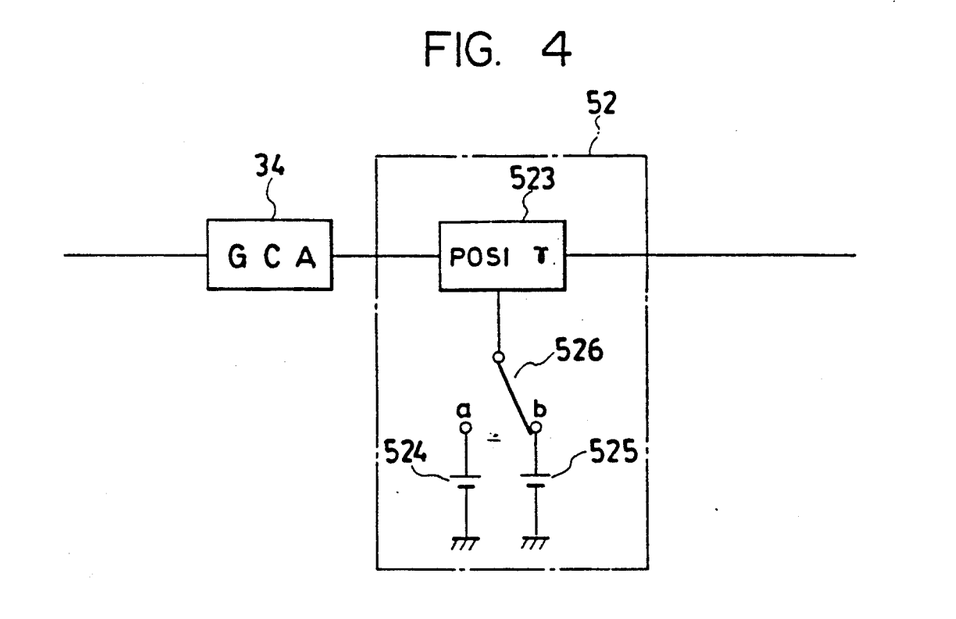
FIG. 4 is a schematic view of another embodiment of the positive gamma correction circuit which is illustrated in FIG. 2.
Figure 5:
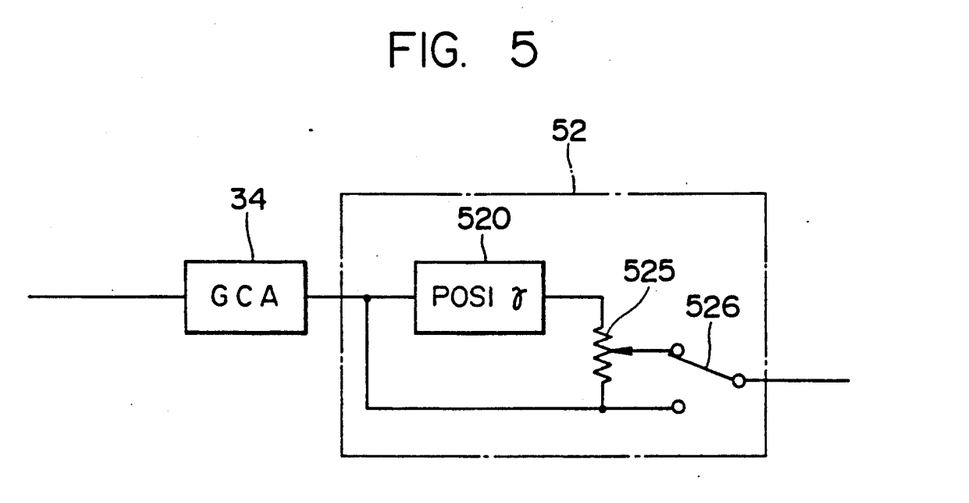
FIG. 5 is a schematic view of a further embodiment of the positive gamma correction circuit shown in FIG. 2.

Referring next to FIGS. 3 to 5, three different and concrete embodiments of the positive gamma correction circuits 52 and 58 are illustrated. However, due to the fact that the positive gamma correction circuits 52 and 58 are identical in structure with each other, a description will be given here for the positive gamma correction circuit 52 only.

The gamma correction circuit 52 illustrated in FIG. 3 includes a gamma circuit 520 which receives the output signal of the variable gain amplifier 34 and corrects the $\gamma$ value of this signal to 0.45, and a switch 521 which selectively changes over the output signal of the gamma circuit 520 and the output signal of the variable gain amplifier 34, that is, the signal having the $\gamma$ value of 1.

The switch 251 is switched over to the contact a thereof ($\gamma = 0.45$) when the object to be photographed by the image sensor 2 is a positive image or the like is similar to a general object, and he switch 251 is changed over to the contact b thereof ($\gamma = 1$) when the object to be photographed is black and white papers. The switch for 251 may be an analog switch the $\gamma$ value which can be automatically changed over to 0.45 or according to the object to be photographed, or the switch 251 may be a 1 switch which can be changed over by means of manual operation.

The positive gamma correction circuit 52 illustrated shown in FIG. 4 includes a variable gamma circuit 523 for varying the $\gamma$ (gamma) value of according to voltages, a power supply 524 for setting the $\gamma$ value to be 0.45, a power supply 525 for setting the $\gamma$ value to be 0.45 or more, and a switch 526 which changes between the power supplies 524 and 525.

The positive gamma correction circuit 52 is used when the variable gamma circuit 523 is constructed in the form of an IC. This positive gamma correction circuit 52 operates in a similar manner to the circuit illustrated in FIG. 3. That is, the $\gamma$ value of 0.45 or more is selected when the object to be photographed by the image sensor is black and white papers. The switch 526 may be an analog switch or a switch which can be operated manually.

The positive gamma correction circuit 52 illustrated in FIG. 5 includes a variable resistor 525, a variable gamma circuit 520 whose $\gamma$ value can be changed by the variable resistor 525, and a switch 526 for selectively changing between a signal having a $\gamma$ value set by the variable resistor 525 and a signal having a $\gamma$ value of 1 to be output from the variable gain amplifier 34.

The above-mentioned variable resistor 525 is set such that the center thereof has the $\gamma$ value of 0.45 and one end thereof has the $\gamma$ value of 1. Also, the switch 526 may be an analog switch or a manually changeable switch.

Figure 6:
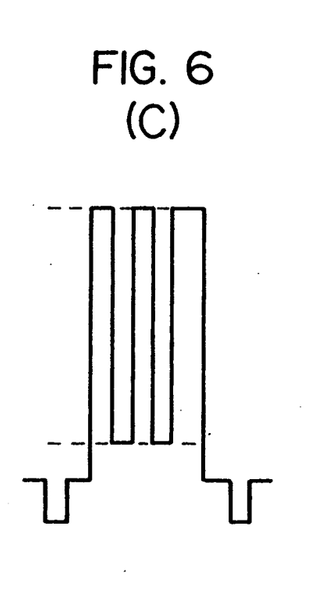
FIGS. 6A–6C are explanatory views illustrating the relationship between the γ correction value and the video signal of the video camera.

Changing the black and white contrast according to the gamma values when the black and white papers are photographed by the video camera will be described next with reference to FIG. 6. In FIG. 6, a curved line P represents the characteristic of $\gamma = 0.45$, and a straight line Q represents the characteristic of $\gamma = 1$. In the positive gamma circuit 52 illustrated in FIG. 3, if the switch 521 is changed over to the contact a side thereof to select $\gamma = 0.45$, then, as illustrated in FIG. 6(A), the output of the black, character section is 40% assuming that the output of the video camera corresponding to the black or white paper section is 100%. The obtained video signals are as illustrated in FIG. 6(B), and the output level difference between the white paper section and the black character section is 60%.

On the other hand, if the switch 521 is changed over to the contact b side thereof to set $\gamma = 1$, then, as illustrated in FIG. 6(A), the output level of the black character section is 13%. The obtained video signals are illustrated in FIG. 6(C), and the output level difference between the white paper section and the black character section is 87%. From this it can be seen that, if the γ value is set to be greater than 0.45 also selected for the ordinary object, then the black and white contrast can be increased.

In the above-described embodiment, when the object to be photographed is black and white papers, the gamma value is selected in the range of $0.45 < \gamma \leq 1$. However, the present invention is not limited to this range, and the gamma value may be selected in the range of $\gamma > 1$ for further increasing the black and white contrast.

As has been described hereinbefore, according to the present invention, due to the fact that the gamma correction for correcting the γ value of the video signals that are obtained from the image pickup is constructed such that one of at least two kinds of discrete γ correction values can be selected according to the objects to be photographed, and the gamma (γ) value can be corrected properly according to the objects to be photographed. Especially, when the objects to be photographed are black and white papers. the gamma (γ) correction value is selected to be a value greater than 0.45 according to the present invention, so that a black and white contrast can be increased on the screen of a television monitor.

It should be understood, however, that there is no intention to limit the present invention to the specific forms disclosed, but on the contrary, the invention is to cover all modifications, alternate constructions and equivalents falling within the spirit and scope of the invention as expressed in the appended claims.

What is claimed is:

1. A video camera apparatus for a photographing images on papers comprising:
   image pickup means for developing video signals of said images on said papers; and
   signal process means for converting said video signals obtained from said image pickup means into a desired format, said signal process means including,
   gamma correction means having first and second discrete gamma correction values for correcting the γ value of said video signals obtained from said image pickup means, one of said first and second discrete gamma correction values corrects the γ value of said video signals to enhance the contrast of color images and the other of said first and second discrete gamma correction values corrects the γ value of said video signals to enhance the contrast of black and white images, and selecting means for selecting one of said first and second discrete correction values in order to enhance the contrast for said images being photographed.

2. A video camera apparatus for photographing images on papers as st froth in claim 1, wherein the other of said first and second discrete gamma correction values is set to be 0.45 or greater when said images to be photographed comprise black and white images on said papers.

3. A video camera apparatus for photographing images on papers as set forth in claim 1, wherein said gamma correction means comprises:
   a γ correction circuit for correction the γ value of aid video signals obtained from said image pickup means by setting the one of said fist and second discrete gamma correction values to 0.45, and
   switch means for switching between the output signal from said correction circuit and said video signal output from said image pickup means, said correction circuit being bypassed according to said images;
   wherein said switch means is switched to develop said video signal and bypass said correction circuit when said images to be photographed comprises black and white images on said papers and said switch means is switched to develop the output form said correction circuit when said image to be photographed comprise color images on said papers.

4. A video camera apparatus for photographing images on papers as set forth in claim 1, wherein said gamma correction means comprises:
   a correction circuit having a γ value that is set according to a supply voltage;
   first power supply means for supplying a first supply voltage as said supply voltage to said γ correction circuit which sets the one of said first and second discrete gamma correction values at 0.45; and
   second power supply means for supplying a second voltage as said supply voltage to said γ correction circuit which sets the other of said fist and second discrete gamma correction values greater than 0.45; and
   switch means interposed between the γ correction circuit and said first and second power supply means for switching between said first and second voltages of said first and second power supply means according to said images being photographed.

5. A video camera apparatus for photographing images on papers as s forth in claim 1, wherein said gamma correction means comprises:
   a γ correction circuit having an output γ value that is changed according to a variable resistor;
   variable resistor setting means for changing said γ value from said γ correction circuit to a value greater than or equal to 0.45 and less than 1 in response to the setting of said variable resistor setting means; and
   switch means for switching between the output from said variable resistor setting means and said video signal output from said image means which bypasses said γ correction circuit according to said images being photographed;
   wherein said switch means selects said video signal from said image pickup means which bypasses said correction circuit when said images being photographed comprise black and white images o said papers and aid switch means selects the output from said variable resistor setting means when said images being photographed comprises color images on said papers.

6. A video camera apparatus for photographing papers as set forth in any one of claims 3 through 5, wherein said switch means comprises an analog switch.

7. A method for photographing images on papers by a video camera apparatus, comprising the steps of:
   (a) developing video signals of said images on said papers;
   (b) converting said video signals developed at said step (a) into a desired format;
   (c) correcting the γ value of said video signals converted by said step (b) by a fist gamma correction value which enhances the contrast of said images when said images comprise color images; and (d) correcting the $\gamma$ value of said video signals converted at said step (b) by a second gamma correction value which enhances the contrast of said images when said images comprise black and white images.

8. A method photographing images as set forth in claim 7, wherein said step (c) corrects the $\gamma$ value of said video signals to 0.45.

9. A method for photographing images as set forth in claim 7, wherein said step (d) corrects the $\gamma$ value of said video signals to greater than 0.45.

* * * * *